United States Patent [19]

Vasko et al.

[11] Patent Number: 6,091,998
[45] Date of Patent: Jul. 18, 2000

[54] SELF ORGANIZING INDUSTRIAL CONTROL SYSTEM USING BIDDING PROCESS

[75] Inventors: David Alan Vasko, Macedonia; Francisco Paul Maturana; Rebecca Jean Herr, both of Twinsburg, all of Ohio; Stephen John VandenBerg, Speers Point; Jeffrey Kian Chee Cheng, Endeavour Hills, both of Australia

[73] Assignee: Rockwell Technologies, LLC, Thousand Oaks, Calif.

[21] Appl. No.: 09/164,204

[22] Filed: Sep. 30, 1998

[51] Int. Cl.[7] .................................................. G06F 19/00
[52] U.S. Cl. ........................................ 700/100; 700/103
[58] Field of Search ............................. 700/97, 100, 102, 700/103, 105, 109

[56] References Cited

U.S. PATENT DOCUMENTS 5,406,476  4/1995  Deziel, Jr. et al. ......................... 700/8
5,909,368  5/1999  Nixon et al. ................................ 700/2
5,946,212  8/1999  Bermon et al. ........................... 700/97
5,953,229  9/1999  Clark et al. ............................. 700/100

*Primary Examiner*—William Grant
*Assistant Examiner*—Chad Rapp
*Attorney, Agent, or Firm*—John J. Horn; William R. Walburn; Keith M. Baxter

[57] ABSTRACT

An industrial control system associates an autonomous control unit with each piece of equipment in an industrial process, the autonomous control units having a model of the equipment's operation and data indicating constraints on the equipment's operation. A product to be produced is abstracted as a set of machine independent steps and performance of these steps bid upon by the autonomous control units according constraints models and internal goals. Bids having conflicting requirements may generate counterbids until a completed plan for the production of the product is generated.

12 Claims, 6 Drawing Sheets

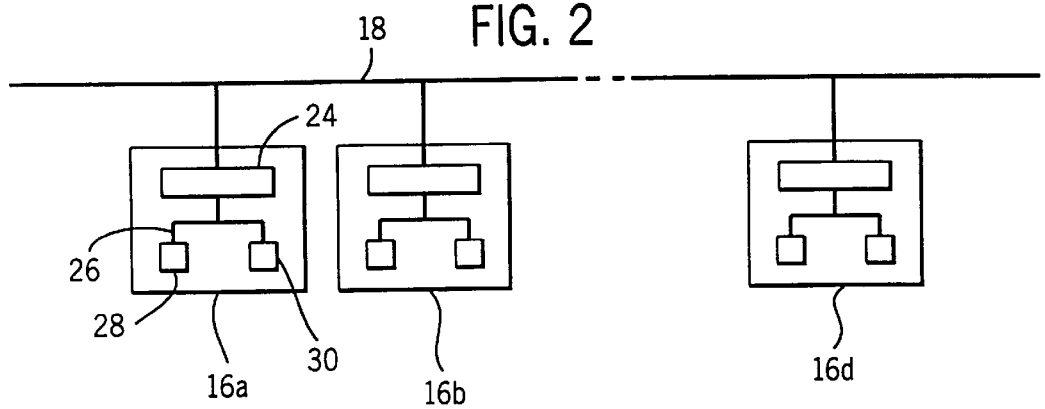
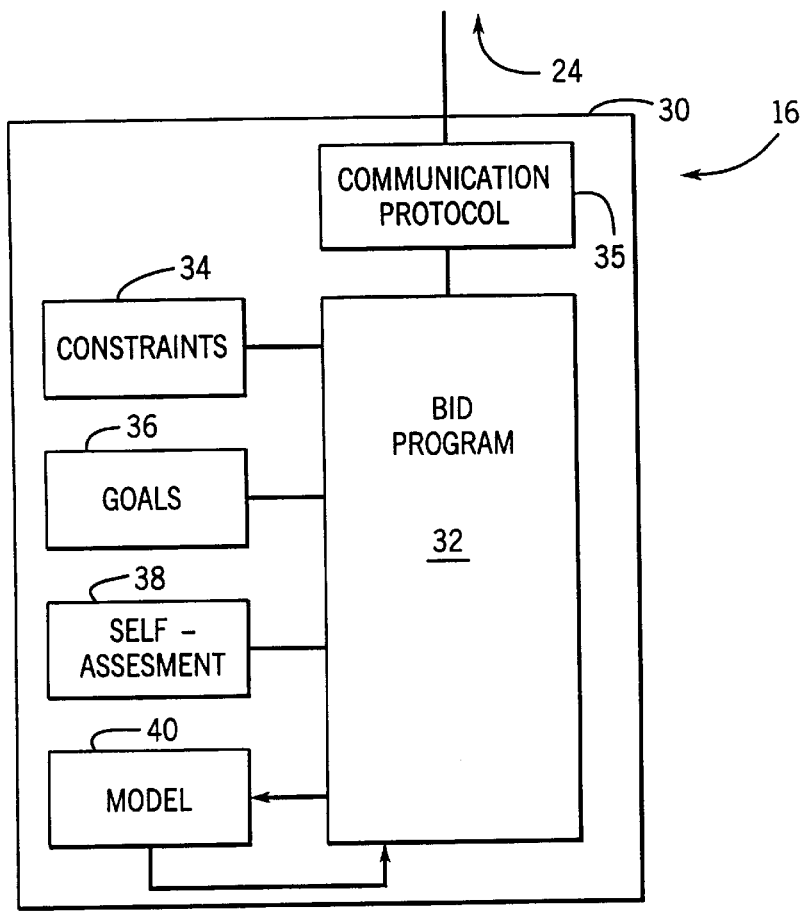

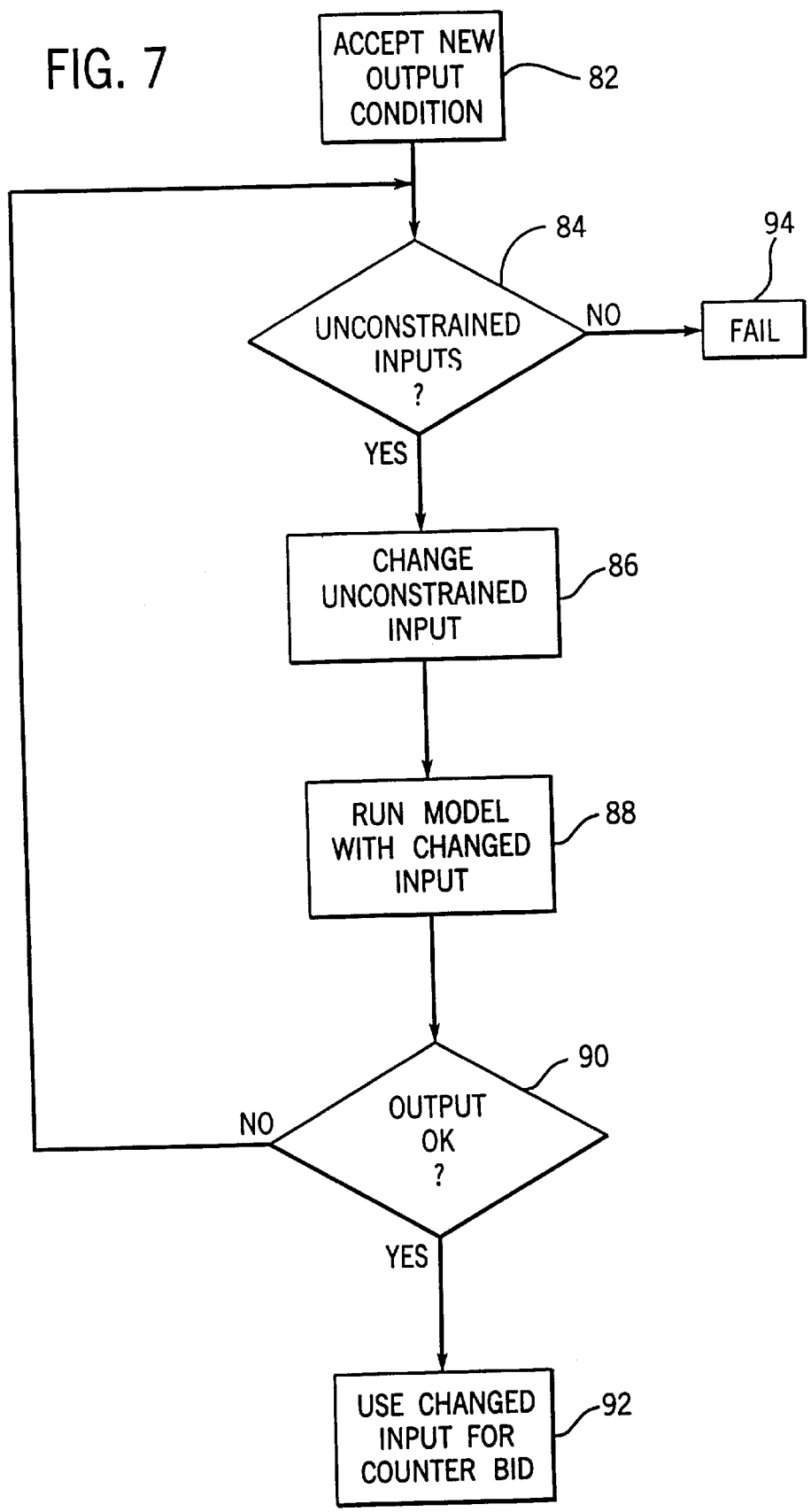

SELF ORGANIZING INDUSTRIAL CONTROL SYSTEM USING BIDDING PROCESS

BACKGROUND OF THE INVENTION

The present invention relates to industrial controllers for the real-time control of equipment used in manufacturing and in particular to an industrial controller that automatically organizes equipment for the manufacture of a product based on the capabilities of the equipment.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

Unlike the standardized software normally executed on conventional computers, the control program executed on an industrial controller is normally unique to each controlled process. The writing and troubleshooting of the control program is thus a significant cost in the creation of an industrial control system. After the controlled program is complete, it must often be modified as the product to be manufactured changes or as equipment is exchanged, replaced or repaired.

Ideally an industrial controller would automatically configure itself to manufacture a product based on knowledge of the available manufacturing equipment and the product's specifications.

BRIEF SUMMARY OF THE INVENTION

The present invention provides a self-configuring industrial control system. An autonomous control unit is associated with each piece of manufacturing equipment and programmed with data describing the capabilities of that equipment and that equipment's ability to interact with other equipment. A desired product is described in a "job description language" and broadcast to the autonomous control units. Each unit identifies portions of the job that they can complete and exchanges "bids" and "counterbids" with the other control units to allocate the job among the units. The autonomous control units are programmed with generalized "goals" so that the allocation may be further optimized for high productivity, low cost or some other objective measure.

Specifically, the present invention provides an industrial control system for controlling an industrial process of interconnected machines operating on a manufactured product. The industrial controller includes a communication link receiving a job description of tasks for producing the desired product and includes a plurality of "autonomous control units", one associated with each machine. Each autonomous control unit includes an interface connecting the autonomous control unit to the communication link to communicate thereon with the other autonomous control units. The autonomous control units also include an electronic memory holding data representing (i) machine constraints indicating constraints on the physical operation of its associated machine; (ii) inter-machine constraints indicating constraints on the operation of its associated machine resulting from interaction of that machine with other machines; and (iii) goals indicating desired trade-offs within the operational constraints.

An electronic computer in each autonomous control unit executes a bid protocol program to receive the job description and the bids by the other autonomous control units and to transmit either a bid or a counterbid for performance of a task to the other autonomous control units. The bids and counterbids are selected to conform to the operational constraints and the goals. The bids also conform to the inter-machine constraints and the counterbids propose new inter-machine constraints. The electronic computer responds to counterbids from other autonomous control units with a modified bid.

Thus, it is one object of the invention to permit an industrial controller to automatically organize the equipment for the production of a product. By investing control units of the industrial controller with goals and with knowledge of the capabilities of associated equipment, the industrial controller may evaluate alternatives for the production of the product.

It is another object of the invention to make use of a market model for resolving conflicting demands between the equipment. The bid and counterbid process allows the equipment to resolve shared parameters for the manufacturing process. Importantly, the present invention provides predictable control solution, that is, when the present invention selects a set of parameters, it can be assured that the parameters can be implemented with the equipment.

The machine constraints may include a list of tasks which the associated machine can perform and the autonomous control unit may transmit a bid and, in the alternative, a counterbid only if at least one task of the job description is on the list of tasks.

Thus, it is another object of the invention to permit use of the present invention in a factory environment where not all machines may be relevant to producing all products.

The electronic memory may further include data representing a model of the operation of the associated machine and the autonomous control unit may evaluate potential modifications of the inter-machine constraints by execution of the model.

It is therefore another object of the invention to provide each autonomous control unit with the ability to make complex assessments of its operational constraints in meeting the bids of other autonomous control units. Use of a model allows evaluation of trade-offs between constraints of the associated equipment.

The model may produce predicted machine outputs when provided with machine inputs and a received counterbid may propose new outputs which are also inter-machine constraints. Using the model, the industrial control system may iteratively apply machine inputs to the model obtain the proposed new outputs thereby obtaining input values that satisfy the counterbid.

Thus it is another object of the invention to enable the autonomous control units to bid upon tasks that are constrained as to outputs when the machine constraints are defined as inputs. The iterative approach allows a model of the process to be run "backwards" to provide a mapping of output constraints to input constraints.

The inter-machine constraints may include limitations of the path of the desired product between machines.

Thus it is another object of the invention to provide an industrial controller accommodating limitations of the topology of the plant layout.

The industrial control system may include a "product autonomous control unit" associated with the desired product and having product constraints and goals and executing a bid protocol program to generate a job description for the other autonomous control units and to select among plans comprised of sets of bids from other autonomous control units.

Thus, it is another object of the invention to allow a further level of optimization of the execution of tasks by allowing the product to enter into the process of selecting possible solutions.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 2 is a schematic block diagram of the autonomous control units of FIG. 1 showing the inter connection of the autonomous control units through interfaces on a common link and a processor and memories of the autonomous control units;

FIG. 3 is a detailed block diagram of the memory of one autonomous control unit of FIG. 2 showing the contained bid program, constraint data, goal data, self-assessment data, and a model of the equipment associated with the autonomous control unit;

FIG. 7 is a flow chart of the operation of the model of FIGS. 3 and 4 in responding to a counterbid per the flow chart of FIG. 6.

DETAILED DESCRIPTION OF THE INVENTION

Components of the Control System

Figure 1:
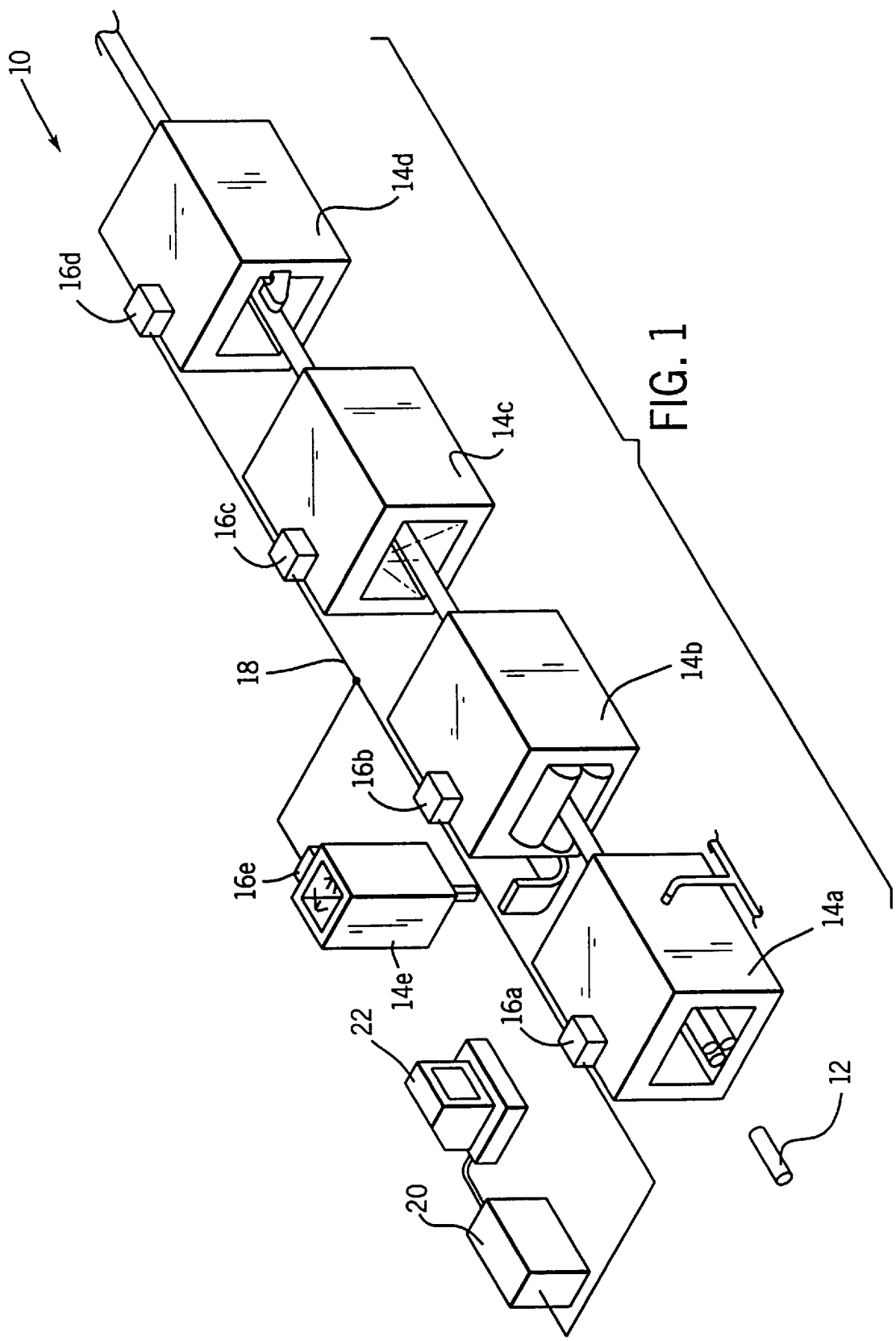
FIG. 1 is a perspective view of a simplified rolling mill composed of a sequential set of machines each associated with an autonomous control unit per the present invention.

Referring now to FIG. 1, an industrial process 10 may provide for the processing of metal billets 12 through a series of machines 14. Each machine 14 may have an associated autonomous control unit 16 being either discrete devices as shown in FIG. 1 or portions of a centralized machine. The autonomous control units 16 are interconnected by a common communication link 18 and are also connected by the communication link 18 to a computer 20 and a human/machine interface such as a computer terminal 22 of conventional design.

In an example process 10, suitable for control by the present invention, machine 14 may include a reheat furnace 14a for heating the billets 12 to a predetermined temperature, a rolling mill 14b for rolling the billets 12 to a predetermined diameter, a water bath 14c for cooling the billets 12 with water and a Stelmor conveyor 12d cooling the billets 12 with air.

Referring now to FIGS. 2 and 3, each autonomous control unit 16 includes an interface circuit 24 connected with the common communication link 18 and handling communication protocols so that the autonomous control units 16 may communicate bids and counterbids among themselves and may receive a job description as will be discussed below. The interface circuits 24 of each autonomous control unit 16 are connected by an internal bus 26 to a processor 28 and memory 30.

Data Structures

Referring now to FIG. 3, the memory 30 holds a bid program 32 that will be used to generate bids and counterbids to be exchanged among the autonomous control units 16 in developing a control strategy for the machines 14. The bid program 32 communicates with the other autonomous control units 16 according to a communications protocol program 35 which also serves to store and sort bids and counterbids and job descriptions and direct bids and counterbids to the correct device as will be described.

The bid program 32 has access to stored data tables representing constraint data 34 which generally quantifies the limitations of performance of the associated machine 14, goal data 36, which describes preferences among modes of operation of the associated machine 14 within the constraints 34, self-assessment data 38 generally describing the dynamic state of the associated machine, and a model 40 modeling operation of the associated machine by mathematical means.

Figure 4:
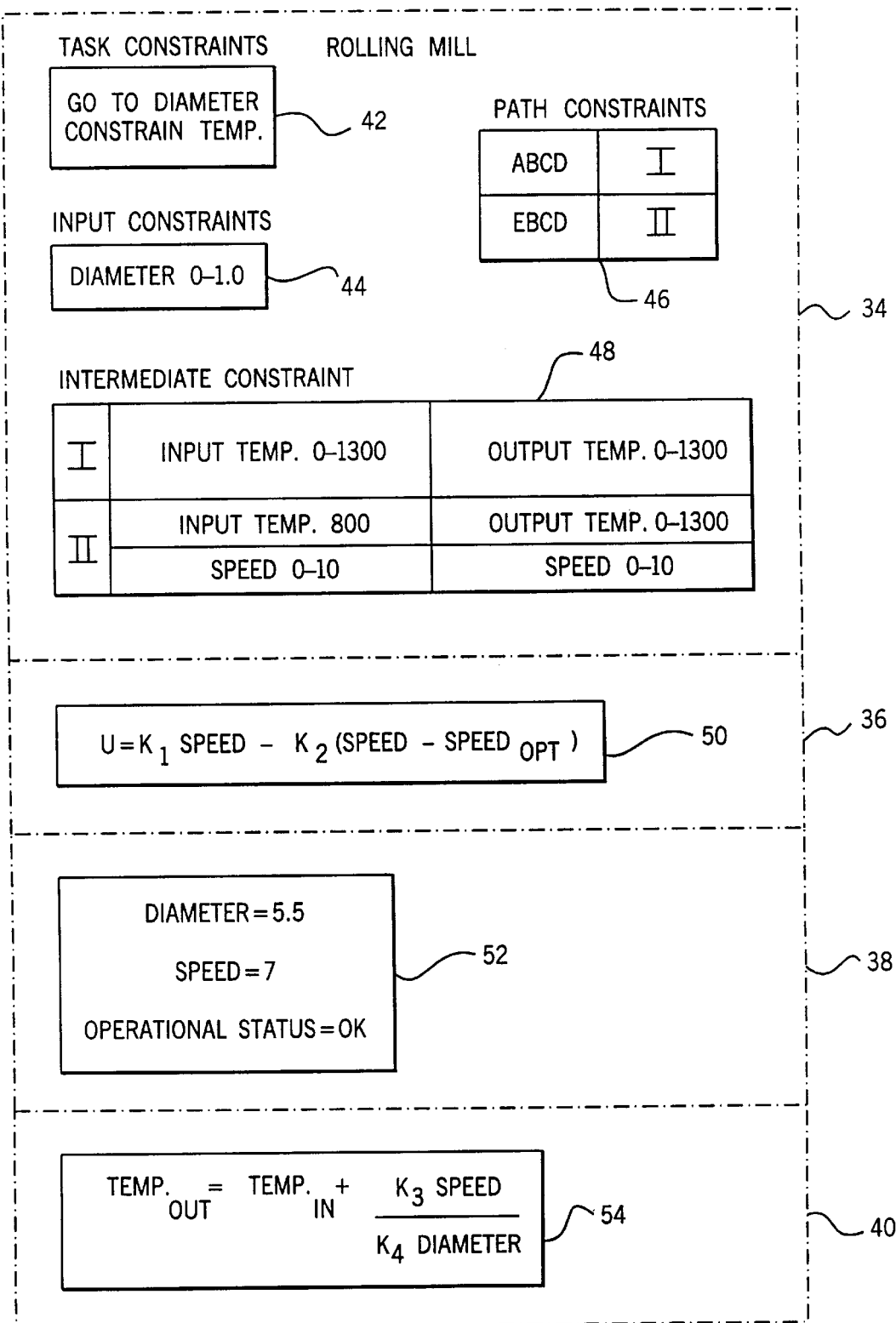
FIG. 4 is an expanded block diagram of the constraint data, goal data, self-assessment data, and model of FIG. 3.

Referring to FIG. 4, the constraints 34 are of a number of different kinds. Task constraints 42 describe generally the kind of operation that the associated machine 14 is intended to perform. Thus, for example, the reheat furnace 14a may perform heating tasks. The task constraints 42 allow the autonomous control units 16 to make a threshold determination as to whether their associated machines 14 will make a bid for a particular task of a plan to produce a product. Continuing with the example of the reheat furnace 14a, the autonomous control unit 16a of the reheat furnace 14a will only bid for tasks requiring heating.

In contrast, the constraint data also includes input constraints 44 describing the limits of the inputs to the associated machine 14. The inputs (as opposed to the outputs of the machines 14) are well defined and their ranges are set by the physical design of the machine. For example for the reheat furnace 14a, the input will be the amount of the gas valve opening and the range of the input will be from zero to one hundred percent. For the rolling mill 14b, the inputs will be rolling diameter and rolling speed. For the water bath 14c, the input will be water flow rate and rolling speed and for the Stelmor conveyor 14d the inputs will be rolling speed and air flow rate.

The constraints 34 also include path constraints 46 which generally reflect limitations on the possible paths of the product, the billet 12, between machines 14 as dictated by their physical layout. In this example, a single simplified path is available in which the billet 12 passes from reheat furnace 14a to rolling mill 14b then to water bath 14c and finally to Stelmor conveyor 14d. This path topology is reflected in the path constraints 46 listing each machine 14 in a first column and all successor machines 14 in a second column. From this table, all possible paths between machines 14 may be determined. Often there will be multiple paths of product flow and thus multiple points of communications between machines 14 and in this case the second column may have more than one machine listed. The path constraints 46 and the input constraints 44 will be termed generally "operational" constraints as they constrain the operation of the machine 14.

Deriving from the path constraints 46 and possibly including some of the input constraints are the "inter-machine" or "intermediate" constraints 48 representing parameters shared between machines 14 based on the path of the material between machines 14. Thus the input temperature of the rolling mill 14b will be constrained to be equal to output temperature of the reheat furnace 14a based on their layout. Further, the rolling mill 14b and water box 14c also share output and input temperatures respectively, and also billet speed i.e., the speed of exit of the billet 12 from the rolling mill 14b equaling the speed of entry of the billet into the water box 14c.

As a result of the coiling of the billet product in the Stelmor conveyor 14d, the water box 14c and Stelmor conveyor 14d do not share the parameter of conveyor speed but do share the parameter of temperature as the temperature of the billet output from the water box 14b will equal the temperature of the billet 12 entering to the Stelmor conveyor.

Referring still to FIGS. 3 and 4, the goal data 36 is implemented as a utility function 50 having as input arguments one or more of the characterizing parameters of the machine 14 either inputs or outputs, and as a value, an arbitrarily defined utility which reflects a preprogrammed goal of the autonomous control unit 16. In the case of the reheat furnace 14a, the utility function 50 may be inversely proportional to the gas valve opening indicating a goal to reduce gas consumption. A more complex utility function 50 might consider the stability of the furnace temperature reflecting the fact that it is advantageous to keep the temperature at a steady state in anticipation of other products.

Generally the autonomous control unit 16 strives to maximize utility within the operational and intermediate constraints.

Other machines will have other goals as selected and programmed by the user or manufacturer. For example, the rolling mill 14b may have a goal of high speed which relates to higher productivity. The goals for the water box 14c and Stelmor conveyor 14d are generally reduction of water and air volume, respectively.

Referring still to FIGS. 3 and 4, the self assessment data 38 will typically include various sensed parameters 52 of the associated machine 14. As shown in FIG. 4 for the reheat furnace 14a, the self assessment data includes current furnace temperature (a sensed output) and the input of gas valve opening. A general operational status for the reheat furnace 14a may also be provided as generated from other inputs and outputs and possibly a heuristic program evaluating the fitness of the machine 14. Generally the self assessment data 38 is used to modify the operation constraints 34 if the operational status of the machine 14 is somehow impaired.

The model 40 provides a mathematical description 54 relating inputs to the machine 14 to its outputs. In the example of the reheat furnace 14a, a simple integral relationship is shown relating output temperature of the furnace 14a to the integral over time of the amount of gas valve opening. This model reflects generally the fact that the temperature is proportional to the opening of the gas valve over a previous interval. Generally far more complex models may be created relating one or more inputs to particular outputs of the machine.

For the rolling mill 14b, the model 40 will take into account the effective rolling speed and diameter reduction of the billet 12 on the billet's temperature. The model for the water box 14c may relate cooling water flow and process speed to surface and internal temperatures. The model 40 for Stelmor conveyor 14d will provide a time and air flow relationship to temperature of the output billet 12. The construction of such models is generally understood in the art and will depend on the particular machine 14.

Job Description Language

Figure 5:
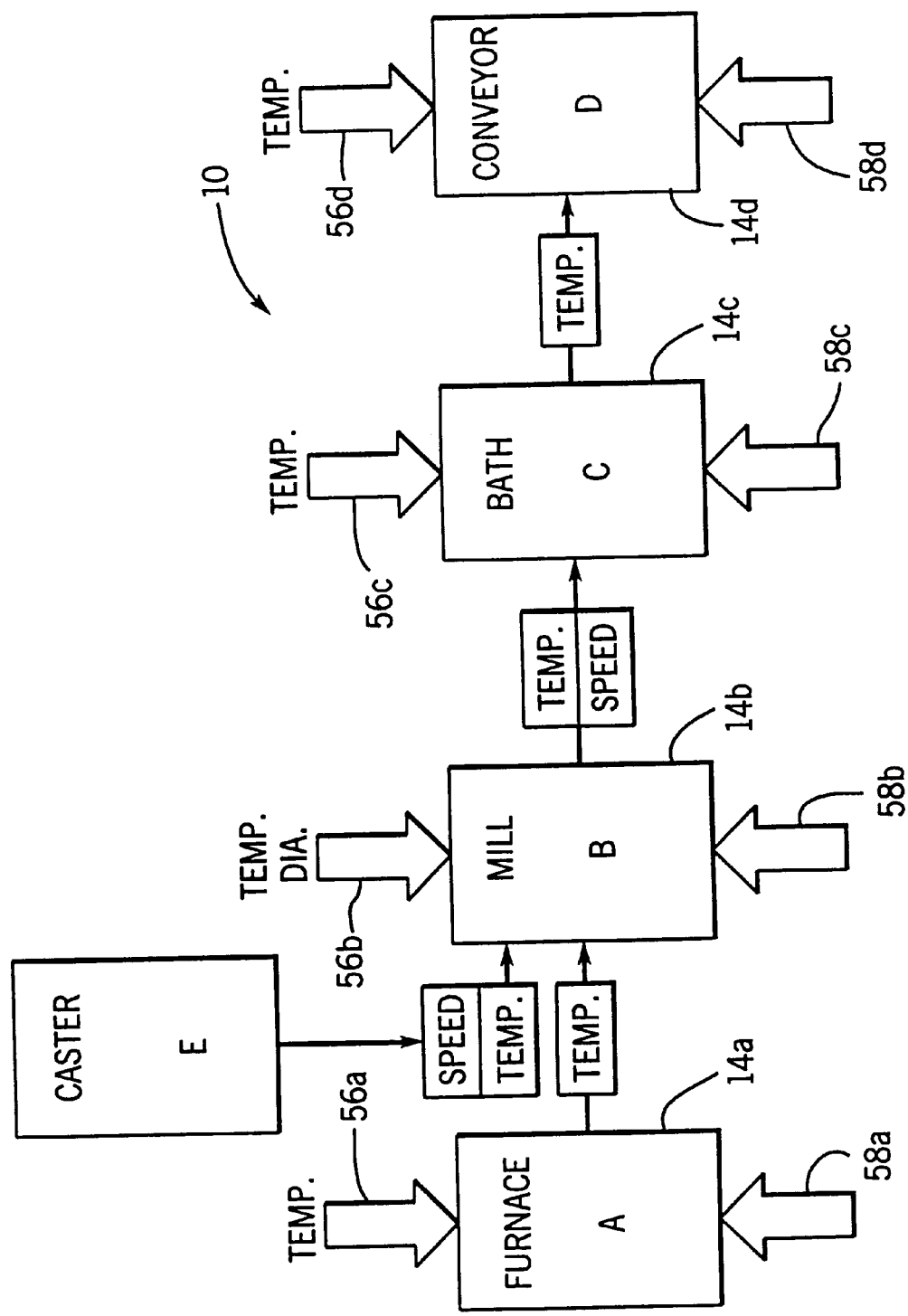
FIG. 5 is a graphical representation of the equipment of the rolling mill of FIG. 1 as defined by various inputs and constraints.

Referring now to FIGS. 1 and 5, a "product" autonomous control unit 16 may be implemented by the computer 20 to represent the desired product to be manufactured from the billet 12. This product autonomous control unit provides a convenient unit for implementing the functions of describing the product to the autonomous control units 16 of the machines 14 and of evaluating the plans produced by the autonomous control units 16 against the product definition. For this first task, the product autonomous control unit, accepts input from a user through computer terminal 22 describing the product characteristics and produces a machine independent description of desired tasks for producing that product in a job description language. In the preferred embodiment, the job description language is an ASCII text file providing a number of steps defining desired machine outputs. For example, to produce a rolled billet, the job description is as follows:

```
STEP 1 =    GOTO TEMP(ALL) < 1300.0
STEP 2 =    GOTO DIAMETER = 5.5 TOL(-0.2, 0.2)
            CONSTRAIN TEMP(ALL) < 1300.0
            CONSTRAIN TEMP(ALL) >825.0 AT TIME = END
            DEPENDS ON (1)
STEP 3 =    GOTO TEMP(SURF) = 850 TOL(-5.0, 5.0)
            CONSTRAIN TEMP(ALL) > 825.0 AT TIME = 0.0
            CONSTRAIN TEMP(SURF) > 450.0 AND < 1300.0
            WITH DIAMETER = 5.5
            DEPENDS ON (2)
STEP 4 =    GOTO TEMP(AVG) = 650.0 TOL(-5.0, 5.0) IN TIME <
            15.0 CONSTRAIN TEMP(SURF) > 500 AT TIME >= 0.0
            AND WITH <= 2.0 DIAMETER = 5.5
            DEPENDS ON (3)
STEP 5 =    GOTO TEMP(AVG) = 600.0 TOL(-5.0, 5.0) IN TIME >
            40.0 WITH DIAMETER = 5.5
            DEPENDS ON (4)
```

Each step defines temperatures (TEMP), diameters (DIAMETER) and tolerances (TOL) of the billet and the sequence (DEPENDS ON) and timing (AT TIME) of the steps. In this example both surface temperature (SURF) and overall temperature (ALL) is considered and so the models 40 must provide outputs for both.

Operation of the Control System

Figure 6:
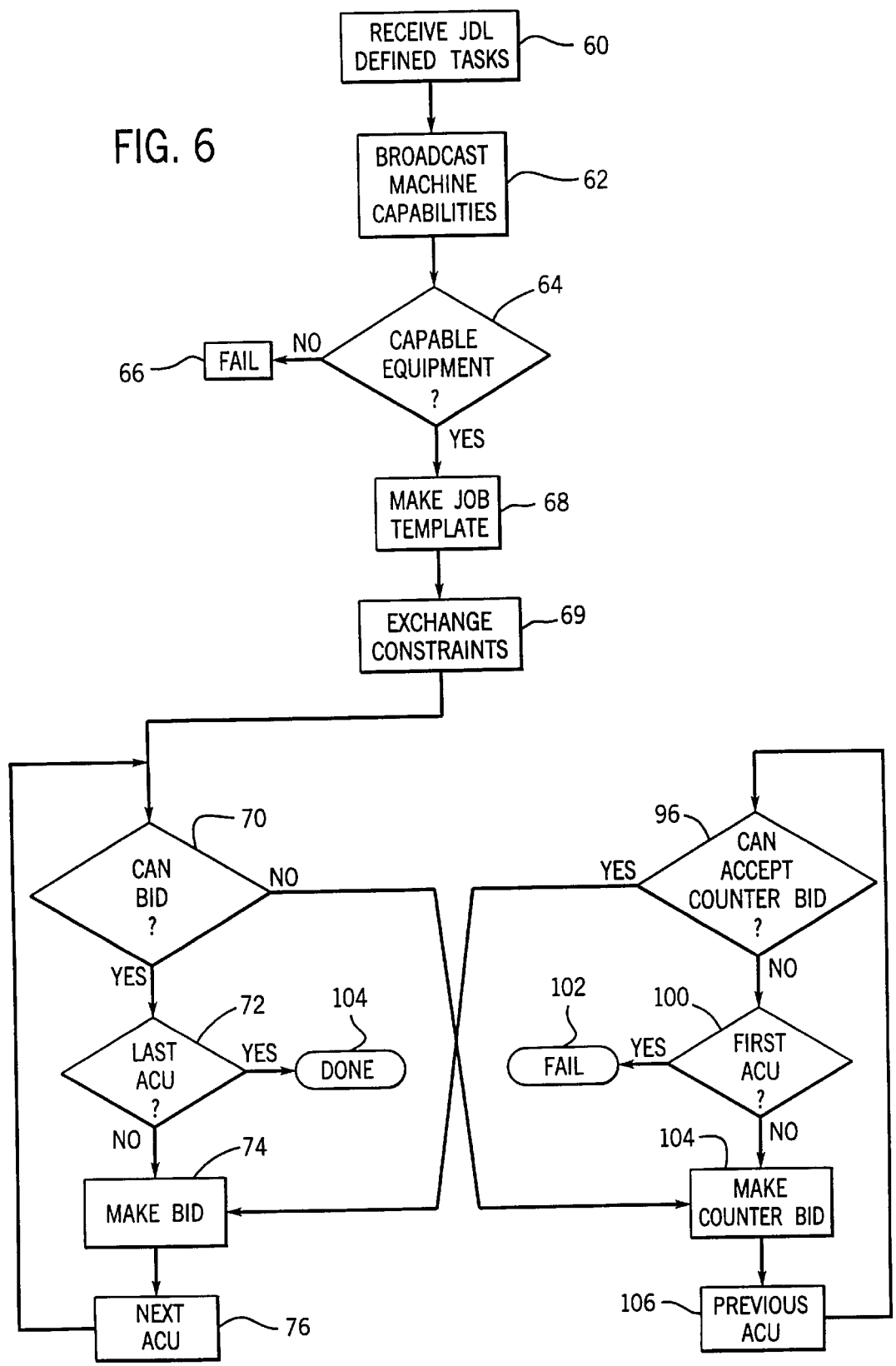
FIG. 6 is a flow chart of the bid program of FIG. 3 such as may be used to generate a control strategy for the machines of FIGS. 1 and 5.

The operation of the autonomous control units 16 (and the computer 20) will now be described with reference to the flow chart of FIG. 6. The flow chart of FIG. 6 is executed in part by different autonomous control unit 16a and the computer 20 as will be apparent from context.

At a first step, the job description language (JDL) is generated by the autonomous control unit implemented in computer 20 for the product is represented by process block 60. At succeeding process block 62, the JDL is broadcast over the communication link 18.

As indicated by decision block 64, each autonomous control unit receiving the broadcast JDL evaluates the tasks of the JDL generally in light of its own task constraints 42 and submits to the most upstream autonomous control unit 16 in the path (indicated by the path constraints 46), and in this case the reheat furnace 14a, an indication of which tasks represented by steps in the JDL, it can perform.

The most upstream autonomous control unit 16a, based on the received indications about task capability from the other autonomous control units 16, next tries to create one or more "template plans" representing a possible allocation of tasks to machines 14. In the event that there is not at least one autonomous control unit 16 indicating an ability to perform at least each step, the JDL, the most upstream autonomous control units 16a, proceeds to a fail state 66 indicating that the desired product cannot be produced by the machines 14.

More typically, at process block 68, one or more job templates will be created as described. A number of different job templates may address different allocation of machines 14 to different steps of the JDL or different material flow paths in the case where the topology is not as simple as the example used herein or different job templates may address different products.

The most upstream machine 14, in this case the reheat furnace 14a, then reads the first step of the JDL, which in this case that indicates the temperature of the product should be raised to a value of less than 1300 degrees, and evaluates whether it can create a bid for that task as indicated by process block 70. Specifically, the autonomous control unit 16 evaluates its current temperature in its self assessment 52 and its goals 36 and the requirements of the JDL create a bid indicating a specific temperature to which the reheat furnace will raise the billet 12. In this case there are as yet no intermediate constraints 48.

Assuming that the autonomous control unit 16a of the reheat furnace 14a may make a bid within the above constraints, the program proceeds to decision block 72 to test if this is the last autonomous control unit on the job path (i.e., the Stelmor conveyor 14d).

At this time it is not, and so the program proceeds to process block 74 where a bid is perfected by broadcasting it to the succeeding rolling mill 14b and more generally to the autonomous control unit(s) immediately downstream from the autonomous control unit 16 making the bid. The autonomous control unit 16a also updates an internal bid storage table (not shown).

The process then proceeds to the next autonomous control unit 16b as generally shown by process block 76. The next autonomous control unit 16b, associated with the rolling mill 14b, receives the template plan and the bid proposed by the reheat furnace 14a. At process block 70, autonomous control unit 16b determines whether it can make a bid based on the information from the JDL and on the constraints 34, including this time, from the intermediate constraint table 48 which links the input temperature or the rolling mill 14b to the output temperature of the reheat furnace 14b.

In the example given, the JDL requires that the temperature of the billet 12 be greater than 825 degrees at the end of the rolling. Assuming for the moment that the temperature selected by the reheat furnace 14a is insufficient for the rolling mill 14b to reach the required output temperature (as may be determined by model 40 for the rolling mill 14b), then at process block 70 the autonomous control unit 16b proceeds to process block 104 to generate a counterbid because no bid could be generated meeting the then existent constraints.

For the counterbid, the autonomous control unit 16b must first determine an acceptable input temperature to the rolling mill 14b. Generally this cannot be done by consulting stored input constraints for temperature because the relevant constraints will dynamically depend on the particular output temperature required. Accordingly the program 32 of the autonomous control unit 16b must refer to the model 40.

Referring now to FIG. 7, the process of determining the necessary input temperature (or an arbitrary input model from a defined output) begins at process block 82 in which the new defined output condition is established. In this example, the output condition is a temperature of greater than 825 degrees as required by the JDL.

At decision block 84, an unconstrained input is identified, in this case an input temperature from the reheat furnace 14a within the temperature range permitted by the rolling mill 14b. By unconstrained it is meant that the input may be varied in a desired direction without violating the input constraints 44.

At process block 86, the identified input is modified, in a direction to reduce the difference between the desired output value (per the JDL and process block 82) and the modeled output value produced by evaluating the model 40 with the unmodified input. The modified input is then evaluated by executing the model 40 as indicated at process block 88 to produce a new output.

At decision block 90 the current output from the model 40 is matched to the desired new output from process block 82 and if the outputs match within a tolerance the modified input established at process block 86 is used for the counterbid as indicated by process block 92.

More typically, at least initially, the outputs will not match and the program loops back to process block 84 for a second or subsequent iteration. If prior to a matching of the outputs, the input becomes constrained and there are no further inputs that can be modified the program proceeds to a fail block 94 indicating the process cannot be completed.

Referring again to FIG. 6, assuming that a suitable counterbid can be obtained at process block 92 of FIG. 7, the counterbid is perfected by forwarding it to the preceding autonomous control unit 16 in this case autonomous control unit 16a.

Autonomous control unit 16a receiving the counterbid at decision 96, determines whether it can accept the counterbid's new proposed output temperature by making a modified bid. Again the model 40 for the reheat furnace 14a may be invoked to determine whether with practical inputs (per input constraints 44) the desired output temperature value can be obtained. If the counterbid may be accepted, the autonomous control unit 16a creates a bid as indicated by process block 74 which is sent to the next succeeding autonomous control unit 16b as part of the job template as before and received by autonomous control unit 16b at process block 70 as has been described.

Referring again to decision block 96, if the counterbid cannot be accepted, then at decision block 100 a test is performed to see it the autonomous control units 16 receiving the counterbid is the first autonomous control unit 16. If it is, then the program proceeds to process block 102 and a failure condition is indicated as would be the case were the reheat furnace 14a receiving the counterbid.

More typically, however, the autonomous control unit 16 receiving a counterbid will not be the first autonomous control unit 16 and thus it is possible to make yet another counterbid indicated by process block 104 to yet an earlier autonomous control unit 16 so as to possibly relax an earlier intermediate constraint.

Bids and counterbids may thus ripple up and down the chain of autonomous control units 16a, 16b, 16c, and 16d until at process block 72 the last autonomous control unit in the material path successfully bids and the program proceeds to process block 104 and the completed plan is forwarded to the product autonomous control unit in the computer 20 to be evaluated along with other plans.

The product autonomous control unit in computer 20 may then accept one of the plans or may change the job description in a process analogous to the counterbidding proposal and the process may be repeated. As a result of the possibility of unresolvable bidding outcomes, the product autonomous control unit 16 normally produces a time limit on the process which if exceeded causes the process to indicate a failure.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An industrial control system for controlling an industrial process of interconnected machines operating on a manufactured product, the industrial control comprising:
    a communication link receiving a job description of a set of tasks for producing a desired product;
    a plurality of autonomous control units, one associated with each machine, each autonomous control unit including:
        (a) an interface connecting the autonomous control unit to the communications link to communicate thereon with other autonomous control units;
        (b) an electronic memory holding data representing:
            (i) machine constraints indicating constraints on the operation of the associated machine resulting from the limitations of the machine;
            (ii) inter-machine constraints indicating constraints on the operation of the associated machine resulting from the interaction of the associated machine with other machines;
            (iii) goals indicating desired operating points within the operational constraints; and
            (iv) a bid protocol program;
        (c) an electronic computer communicating with the interface to receive the job description and the electronic memory and executing the bid protocol program to:
            (i) in response to the job description and bids by other autonomous control units, transmitting a bid over the communications link describing performance of a task by the associated equipment operating within the machine constraints, inter-machine constraints and according to the goals and in the alternative, a counterbid proposing new inter-machine constraints;
            (ii) in response to counterbids received over the communication link from other autonomous control units, transmitting a modified bid over the communications link describing performance of a task by the associated equipment operating within the machine constraints, the inter-machine constraints as modified by the received counterbid and according to the goals, and in the alternative, a counterbid proposing new inter-machine constraints;

whereby the set of tasks for producing the desired product may be automatically allocated among the machines.

2. The industrial control system of claim 1 wherein the inter-machine constraints are parameters of shared inputs and outputs between interconnected machines.

3. The industrial control system of claim 1 wherein the machine constraints include a list of tasks which the associated machine can perform and wherein the autonomous control unit transmits a bid and in the alternative, a counterbid only if at least one task of the job description is on the list of tasks.

4. The industrial control system of claim 1 wherein the electronic memory further includes data representing a model of the operation of the associated machine and wherein the autonomous control system evaluates the modified inter-machine constraints by execution of the model.

5. The industrial control system of claim 4 wherein the model produces predicted machine outputs when provided with machine inputs and wherein the received counterbid provides proposed new outputs representing the modification of the inter-machine constraints iteratively applies machine inputs to the model within the machine constraints to try to obtain the outputs of the modified inter-machine constraints.

6. The industrial control system of claim 1 wherein the inter-machine constraints include limitation of the path of the desired produce between machines.

7. The industrial control system of claim 1 wherein bids are transmitted on the communication link between autonomous control units following a path that the desired product would take between associated machines and wherein counterbids are transmitted on the communications link between autonomous control units counter to a path that the desired produce would take between associated machines.

8. The industrial control system of claim 1 including a product autonomous control unit associated with the desired product, the produce autonomous control unit including:
    (a) an interface connecting the product autonomous control unit to the communications link to communicate thereon with other autonomous control units;
    (b) an electronic memory holding data representing:
        (i) product constraints indicating constraints on the parameters of the desired;
        (ii) goals indicating desired operating points within the product constraints; and
        (iii) a bid protocol program;
    (c) an electronic computer communicating with the interface to receive the job description and the electronic memory and executing the bid protocol program to:
        (i) generate a job description;
        (ii) select among plans comprised of sets of bids from other autonomous control systems.

9. The industrial control system of claim 1 wherein the goals are maximization of utility function having input values of the operational parameters of the machines.

10. The industrial control system of claim 1 wherein the autonomous control units produce multiple bids associated with different plans.

11. The industrial control system of claim 1 wherein the different plans are associated with different products.

12. The industrial control system of claim 1 wherein the different plans are associated with different paths of the product through the machines.

* * * * *